United States Patent [19]

Verhulst

[11] 4,351,551
[45] Sep. 28, 1982

[54] BALE TWINE KNOTTER WITH ADJUSTABLE WIPER

[75] Inventor: Michael J. Verhulst, Ottumwa, Iowa
[73] Assignee: Deere & Company, Moline, Ill.
[21] Appl. No.: 172,307
[22] Filed: Jul. 25, 1980
[51] Int. Cl.³ .................. A01D 59/04; B65H 69/04
[52] U.S. Cl. ................................ 289/2; 289/9; 289/10; 289/13
[58] Field of Search .................. 289/2, 9, 10, 13

[56] References Cited
U.S. PATENT DOCUMENTS

| 752,912 | 2/1904 | Maul | 289/10 |
|---|---|---|---|
| 2,793,890 | 5/1957 | Smith | 289/9 |
| 2,815,234 | 12/1957 | Collins | 289/10 X |
| 2,823,059 | 2/1958 | Smith | 289/10 |
| 3,419,300 | 12/1968 | Nult et al. | 289/13 |
| 4,074,623 | 2/1978 | White | 289/2 |

OTHER PUBLICATIONS

Operator's Manual, John Deere, 446 Series Baler OM-E57832, Issue B5, pp. 11, 12 & 29, dated Feb. 1975.

*Primary Examiner*—Louis Rimrodt

[57] ABSTRACT

A bale twine knotter comprised of a rotatably mounted billhook for forming a loop of twine thereabout and a wiper arm with an improved adjustably mounted wiper for sliding a twine loop from the billhook while the twine end is retained in a jaw of the billhook to complete the formation of a twine knot. The adjustable mounting of the wiper permits the spacing of the wiper from the billhook to be adjusted easily and accurately and permits the wiper and wiper arm to be made of strong, rigid materials.

2 Claims, 9 Drawing Figures

BALE TWINE KNOTTER WITH ADJUSTABLE WIPER

BACKGROUND OF THE INVENTION

This invention relates to twine knotters for hay or straw baling machines and more particularly to an improved wiper arm for such knotters.

In one conventional baler, the twine knotter includes a rotatably mounted billhook for forming a loop of twine thereabout. On one side of the billhook is a wiper arm which has a pair of finers defining a fork for receiving and guiding twine used to tie a bale. On the other side of the billhook is a knife riveted to the fork for cutting the twine after a loop in the twine has been formed around the billhook. A wiper is formed integrally with the fork of the arm and strips or wipes the loop of twine from around the billhook as the severed end of the twine is held in the billhook jaw.

Proper adjustment of the wiper arm relative to the billhook is critical to the operation of the knotter as the wiper must strip or wipe the twine loop from the billhook to complete the formation of the knot. Wiper arm adjustment is performed initially at the point of manufacture and periodically thereafter when servicing the baler. It is accomplished by modeling or bending the arm in three areas with a special tool. By modeling, the wiper is centered with respect to the heel of the billhook and adjusted so that it just clears the billhook jaw. For this reason, it is desirable that the wiper arm be relatively rigid and unyielding so that proper adjustment can be maintained and yet be sufficiently bendable to permit initial adjustment. Also, in recent years, stronger twines are being used on such balers to tie bales of higher density. Such changes subject the wiper arm to higher forces during operation thus making it more difficult to maintain the arm in proper adjustment, while at the same time, making the arm flexible enough to permit initial adjustment.

Accordingly, it is an object of this invention to provide a knotter with an improved wiper arm having a strong and rigid construction to maintain an accurate adjustment.

Another object of this invention is to provide a knotter with a wiper arm which has a wiper which is easily and accurately adjustable with respect to the billhook of the knotter.

SUMMARY OF THE INVENTION

These and other objects of the invention are accomplished by knotter comprising a rotatably mounted billhook for forming a loop of twine thereabout and a wiper arm with an improved adjustably mounted wiper for sliding a twine loop from the billhook while the twine end is retained in a jaw of the billhook to complete the formation of a twine knot. In one embodiment, the wiper has slots formed therein and is adjustably mounted on the arm and relative to the billhook by screws inserted through the slots and threadably mounted in the arm. In a second embodiment, the wiper has first and second portions joined together at a right angle and is adjustably mounted relative to the arm and to the billhook of the knotter by the insertion and removal of shims between the second portion of the wiper and the arm.

DESCRIPTION OF THE PREFERRED EMBODIMENTS

Figure 1:
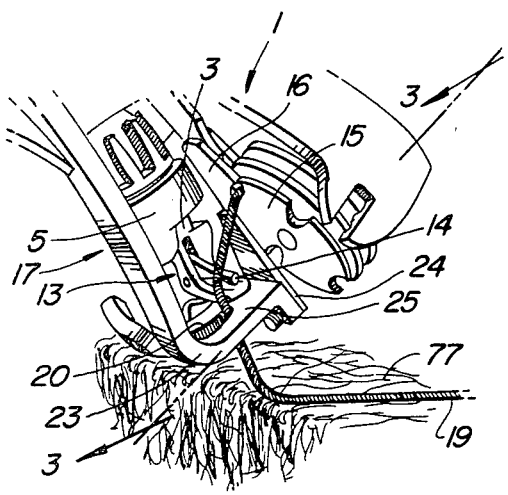
FIG. 1 is a fragmentary perspective view of a twine knotter in accordance with a preferred embodiment of this invention.
Figure 2:
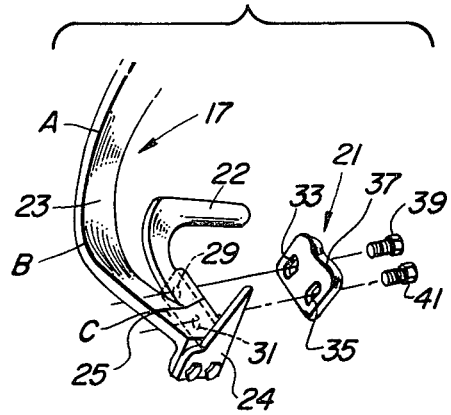
FIG. 2 is an exploded view of a wiper arm of the knotter shown in FIG. 1.
Figure 3:
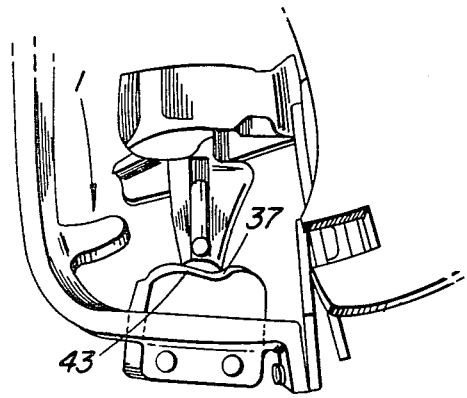
FIG. 3 is a view of the knotter of FIG. 1 taken along line 3—3.

FIGS. 1-3 show in fragmentary form a knotter 1 in accordance with the preferred embodiment of this invention. Knotters of this general type are well known in the art and are widely used commercially, such as in the John Deere 466 Series balers sold by John Deere Company, a corporation of Delaware. Such balers are used for the baling of hay or straw into a rectangular parallelpiped shaped bale.

Knotter 1 comprises a billhook 13 including (1) a central shaft 3 on which billhook 13 is rotatably mounted in a knotter frame 5 and (2) a jaw 14 around which a loop of twine is formed as billhook 13 is rotated and for retaining the twine end during knot formation. On one side of billhook 13 a twine disk 15 and a twine holder 16 are provided for holding a segment of twine 19. On the opposite side and below billhook 13, a wiper arm 17 is provided. Wiper arm 17 (FIGS. 1, 2) includes a twine guiding fork 20 preferably of cast iron, a knife blade 24 bolted to fork 20 for cutting the twine and a wiper 21 for removing a loop of twine 19 from billhook 13. Fork 20 consists of a pair of fingers 22, 23 between which twine 19 is received and guided and a vertex 25 at which fingers 22, 23 are joined. One side of vertex 25 has a boss 25 with a pair of threaded apertures 29, 31 and to which wiper 21 is adjustably mounted. Fork 20 may be formed either by casting or forging and therefore is a strong, rigid component.

Wiper 21, preferably of case hardened steel, is plate-like and has a pair of slots 33, 35 corresponding in spacing to the threaded apertures 29, 31 of boss 25. The profile of wiper 21 is conventional and has an arcuate recess or ledge 37. Wiper 21 is detachably mounted to fork 20 by a pair of screws 39, 41 which pass through slots 33, 35 and threadably engage apertues 29, 31 so that fork 20 and wiper 21 are held tightly together. Wiper 21 is adjustable relative to fork 20 by moving wiper 21 back and forth in a plane parallel to the major planes of wiper 21 and in a direction parallel to the direction of elongation of slots 33, 35 when screws 39, 41 are loosened.

Referring now to FIG. 3, wiper 21 is positioned closely to billhook 13 with ledge or recess 37 centered in relation to an outer surface or heel 43 of jaw 14. The maximum recommended clearance between a first portion 43 of jaw 14 and ledge 37 is 2.4. mm. at the closest distance which jaw portion 45 approaches during rotation of billhook 13 during the formation of a twine knot.

In contrast to the conventional integral wiper arm described in the Background of the Invention which requires modeling or bending of the wiper arm at positions corresponding to positions A, B and C shown in FIG. 2 in order to adjust the wiper with respect to the billhook for proper stripping of a twine loop from the billhook, the present embodiment of the invention achieves alignment simply and easily by adjustment of wiper 21 by loosening of screws 39, 41 and sliding plate-like wiper 21 back and forth. This permits fork 20 and wiper 21 to be formed of strong, rigid material as they are not required to be deformable in use.

Figure 4:
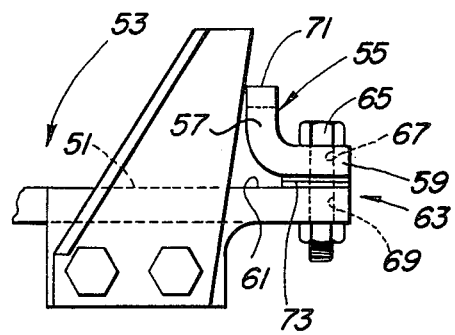
FIG. 4 is a fragmentary perspective view of a knotter wiper arm in accordance with a second embodiment of this invention.

In accordance with the features of a second embodiment of this invention, FIG. 4 shows a vertex 51 of a wiper arm 53 identical to wiper arm 17 except for the portion shown and described in FIG. 4. Wiper arm 53 includes a wiper 55 having first and second portions 57, 59 joined together at a right angle. Wiper 55 is adjustably mounted to a major surface 61 of vertex 51 by an attachment means 63, here shown as a pair of bolts (only one of which—bolt 65—is visible in FIG. 4) inserted through aperture 67, 69 in wiper 55 and vertex 51, respectively. Adjustment of the height of a ledge 71 of wiper 55 above surface 61 is accomplished by the insertion and removal of shim means 73 inserted on bolt 65 between surface 61 and second portion 59 of wiper 55. Shim means 73 is here shown as a plurality of washers.

The functioning of knotter 1 for tying twine around a bale of hay is conventional and will be described herein only briefly. Particular reference is made to FIG. 1 and FIGS. 5-9 which show the progressive stages of knot formation.

Figure 5:
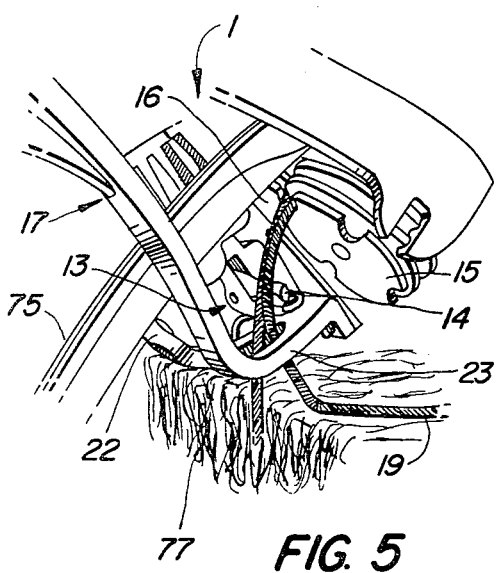
FIGS. 5–9 are fragmentary perspective views of a knotter of FIG. 1 showing progressive stages of knot tying.
Figure 6:
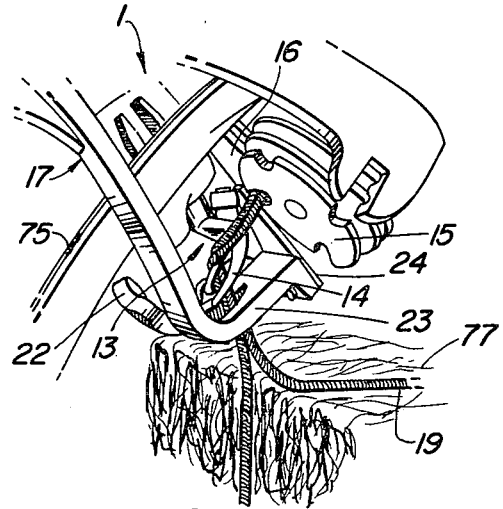
Figure 7:
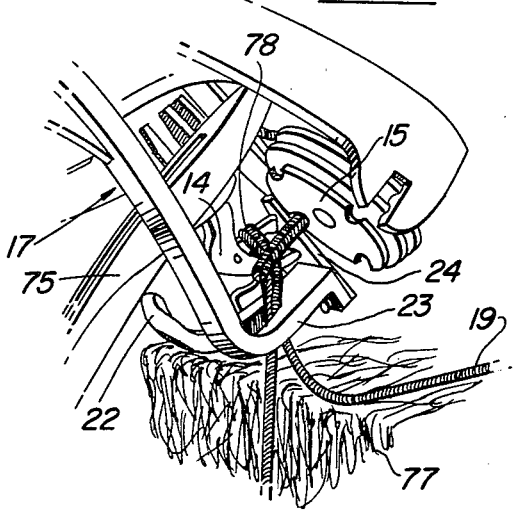
Figure 8:
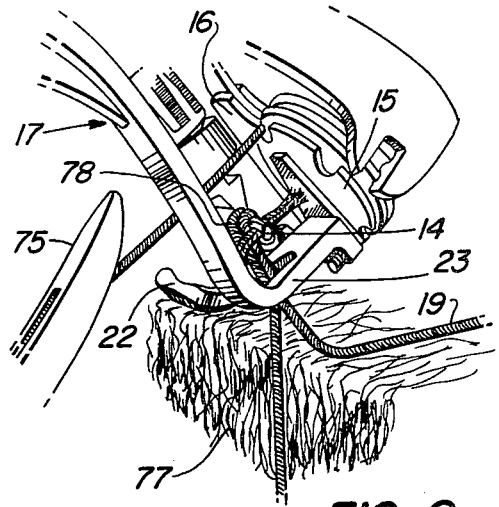
Figure 9:
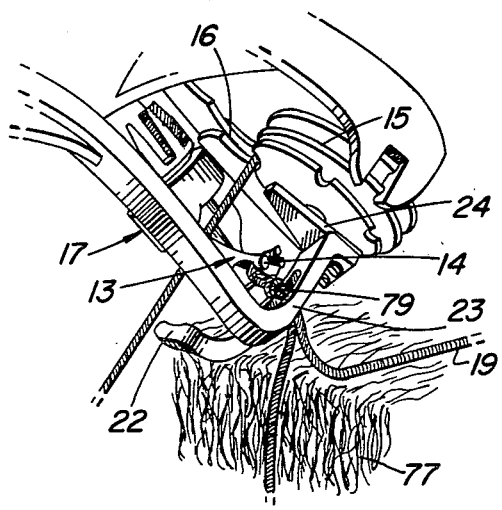

FIG. 1 shows the condition when a needle 75 (shown in FIG. 5) is threaded with twine 19 stored in a twine box (not shown) and from a prior cycle, one end of twine 19 is held in twine disk 15 by twine holder 16. Twine 19 is threaded through fork 20 between fingers 22, 23 and over the top of bale 77. As bale 77 is formed and moves against twine 19, twine 19 is extended across the outer surface of bale 77 by pulling more twine from the twine box. As shown in FIG. 5, when bale 77 reaches a predetermined length, a measuring wheel (not shown) activates knotter 1; and needle 75 (with the help of a tucker finger, not shown) brings a second strand of twine 19 from below and around the trailing end of bale 77, through fork 20, across billhook 13 and into twine disk 15. In FIG. 6, disk 15 is then turned (counterclockwise) sufficiently to permit twine holder 16 to secure both strands of twine 19 in disk 15 and billhook 13 starts to revolve. The turning of billhook 13 (FIG. 7) causes a loop 78 of twine 19 to be formed around the exterior surface of billhook 13, and jaw 14 is opened to receive twine 19. Wiper arm 17 (FIG. 7) is moved, thereby advancing knife 24 against twine 19 to cut twine 19 (FIG. 8) between billhook 13 and disk 15. At this stage, (FIG. 7) needle 75 begins to recede, leaving twine 19 held in disk 15 for the formation of the next knot in the next knotter cycle. Jaw 14 (FIG. 8) is closed and holds the ends of twine 19 tightly. Further movement of wiper arm 17 causes wiper 21 to push or wipe the twine loop 78 from billhook 13 as jaw 14 holds the two cut ends of twine 19 in preparation for the completion of the knot 79. Knot 79 (FIG. 9) is thus tied when knot 79 is wiped from billhook 13, pulling the cut ends from jaw 14. This completes the tie around the bale 77.

Needle 44 returns to a position beneath the bale chamber and leaves a strand of twine 19 in disk 15 and extending through bale chamber (not shown) ready to receive material for the formation of the next bale.

The coordinated movement of wiper arm 17, twine disk 15, twine holder 16, billhook 13, is performed by a conventional gear drive mechanism and mechanical movement which forms no part of the invention herein and is therefore not described.

It will be appreciated that while the invention has been described in connection with certain preferred embodiments thereof, other modifications and variations will be apparent to those skilled in the art. For example, the materials and dimensions are only preferred. Other recognized equivalents may be substituted without departing from the invention. Accordingly, the appended claims are intended to comprehend all such modifications and variations as are within the true spirit and scope of the invention.

I claim:

1. In a twine knotter for a crop baling machine comprising:
   a rotatably mounted billhook for forming a loop of twine thereabout;
   a wiper arm comprising:
   (a) a fork defined by a pair of fingers for receiving and guiding twine therebetween; and
   (b) a wiper extending transverse to said fingers, the improvement comprising:
   (c) at least one transversely extending slot formed in said wiper; and
   (d) screw means extending through said slot for releasably fixing said wiper to said arm, said wiper transversely movable back and forth relative to said fork.

2. In a twine knotter for a crop baling machine comprising:
   a rotatably mounted billhook for forming a loop of twine thereabout;
   a wiper arm comprising:
   a fork defined by a pair of fingers for receiving and guiding twine therebetween and a wiper for sliding a twine loop from said billhook, the improvement comprising:
   said wiper including first and second portions joined together at a right angle;
   attachment means for mounting said wiper to said fork, and
   shim means disposed between said second portion of said wiper and said fork for adjustably determining the transverse extension of said first portion from said fork.

* * * * *